United States Patent
Ausborne, Jr.

(10) Patent No.: US 7,051,471 B1
(45) Date of Patent: May 30, 2006

(54) TACKLE BOX ROD CARRIER

(76) Inventor: Herman E. Ausborne, Jr., 220 C Hemstead St., Lexington, NC (US) 27292

( * ) Notice: Subject to any disclaimer, the term of this patent is extended or adjusted under 35 U.S.C. 154(b) by 0 days.

(21) Appl. No.: 10/994,610

(22) Filed: Nov. 22, 2004

(51) Int. Cl.
A01K 97/06 (2006.01)
A01K 97/10 (2006.01)

(52) U.S. Cl. ............... 43/54.1; 43/21.2; 206/315.11; 224/920; 224/922

(58) Field of Classification Search ............. 43/21.2, 43/54.1; 206/315.11; 224/922, 920
See application file for complete search history.

(56) References Cited

U.S. PATENT DOCUMENTS

| | | | | |
|---|---|---|---|---|
| 908,903 A * | 1/1909 | Thornton | ............... | 43/54.1 |
| 1,970,962 A * | 8/1934 | Hinckley | ............... | 224/922 |
| 2,153,549 A * | 4/1939 | Cooper | ............... | 43/54.1 |
| 2,501,270 A * | 3/1950 | Fleming | ............... | 206/315.11 |
| 2,555,073 A * | 5/1951 | Zdankoski | ............... | 43/54.1 |
| 2,596,403 A * | 5/1952 | Hoffman | ............... | 43/54.1 |
| 2,724,208 A * | 11/1955 | Nelson | ............... | 206/315.11 |
| 2,823,971 A * | 2/1958 | Hoyt | ............... | 43/54.1 |
| 3,095,663 A * | 7/1963 | Miller | ............... | 43/54.1 |
| 3,310,905 A * | 3/1967 | Davis et al. | ............... | 206/315.11 |
| 3,327,978 A * | 6/1967 | Gates | ............... | 43/21.2 |
| 3,493,102 A * | 2/1970 | Belokin, Jr. | ............... | 206/315.11 |
| 3,543,432 A * | 12/1970 | Gates | ............... | 43/54.1 |
| 3,555,719 A * | 1/1971 | Butler | ............... | 43/54.1 |
| 3,667,708 A * | 6/1972 | Smeltzer | ............... | 43/21.2 |
| 3,678,611 A * | 7/1972 | Files | ............... | 43/54.1 |
| 3,713,529 A * | 1/1973 | Meksula | ............... | 206/315.11 |
| 3,832,796 A * | 9/1974 | Cardwell et al. | ............... | 43/54.1 |
| 3,889,860 A * | 6/1975 | Lindsey | ............... | 224/922 |
| 3,921,868 A * | 11/1975 | Reichbach | ............... | 224/922 |
| 3,948,579 A * | 4/1976 | Schirmer | ............... | 206/315.11 |
| 3,987,574 A * | 10/1976 | Pennino | ............... | 43/54.1 |
| 4,014,128 A * | 3/1977 | Hrdlicka | ............... | 43/54.1 |
| 4,049,165 A * | 9/1977 | Goldhaft | ............... | 224/920 |
| 4,095,364 A * | 6/1978 | Prine | ............... | 43/54.1 |
| 4,106,811 A * | 8/1978 | Hernandez | ............... | 43/54.1 |
| 4,228,894 A * | 10/1980 | Lyles | ............... | 224/920 |
| 4,353,182 A * | 10/1982 | Junkas et al. | ............... | 43/54.1 |
| 4,529,112 A * | 7/1985 | Miller | ............... | 43/21.2 |
| 4,628,628 A * | 12/1986 | Burgin et al. | ............... | 43/21.2 |
| 4,638,593 A * | 1/1987 | Garcia | ............... | 43/54.1 |
| 4,747,490 A * | 5/1988 | Smith | ............... | 206/315.11 |
| 4,841,660 A * | 6/1989 | James | ............... | 43/54.1 |
| 5,054,669 A * | 10/1991 | Zimbardi et al. | ............... | 43/54.1 |
| 5,092,263 A * | 3/1992 | Hutchison et al. | ............... | 43/54.1 |

(Continued)

FOREIGN PATENT DOCUMENTS

DE 3626574 A1 * 2/1988

(Continued)

OTHER PUBLICATIONS

Four (4) page photocopies of Cabela's Christmas catalog 2004, including the front and back cover pages, the inside of the front cover page and page 282, entitled "Angler's Tote".

(Continued)

Primary Examiner—Darren W. Ark

(57) ABSTRACT

A tackle box rod carrier is provided with a case which includes internal, divided compartments for transportation of small fishing tackle items while the exterior of the case offers standard hanger pairs for releasably securing a series of fishing rods thereto. The rectangularly shaped case has a bottom hinge to allow the compartments to separate during access while pivotable covers for each compartment prevents spillage of the contents once the case is closed.

5 Claims, 3 Drawing Sheets

U.S. PATENT DOCUMENTS

| | | | |
|---|---|---|---|
| 5,125,183 A * | 6/1992 | Tisdell | 43/54.1 |
| 5,131,179 A * | 7/1992 | McEwen | 43/54.1 |
| 5,152,494 A * | 10/1992 | Frunzar | 43/21.2 |
| 5,159,777 A * | 11/1992 | Gonzalez | 43/54.1 |
| 5,185,952 A * | 2/1993 | Bruce | 43/54.1 |
| 5,205,429 A * | 4/1993 | Woolworth et al. | 43/54.1 |
| 5,209,009 A * | 5/1993 | Fast | 43/54.1 |
| 5,303,500 A * | 4/1994 | Luukonen | 43/54.1 |
| 5,305,542 A * | 4/1994 | Phelps | 43/54.1 |
| 5,305,544 A * | 4/1994 | Testa, Jr. | 43/54.1 |
| 5,331,761 A * | 7/1994 | Kuthy | 43/54.1 |
| 5,347,746 A * | 9/1994 | Letson | 43/57.1 |
| 5,392,557 A * | 2/1995 | Harmon et al. | 43/57.1 |
| 5,515,640 A * | 5/1996 | Cosby et al. | 43/54.1 |
| 5,606,820 A * | 3/1997 | Suddeth | 206/315.11 |
| 5,636,469 A * | 6/1997 | Pizzolo et al. | 43/54.1 |
| 5,836,103 A * | 11/1998 | Taylor | 43/54.1 |
| 5,873,192 A * | 2/1999 | Chiu | 43/54.1 |
| 5,913,673 A * | 6/1999 | Womac | 43/54.1 |
| 5,938,023 A * | 8/1999 | Herron et al. | 43/54.1 |
| 5,941,015 A * | 8/1999 | Jenkins | 43/54.1 |
| 5,950,352 A * | 9/1999 | Volmer | 43/54.1 |
| 6,047,491 A * | 4/2000 | De Busk | 43/21.2 |
| 6,065,595 A * | 5/2000 | Ratcliff | 206/315.11 |
| 6,119,858 A * | 9/2000 | Davidson | 206/315.11 |
| 6,185,860 B1 * | 2/2001 | Thibodeaux | 43/54.1 |
| 6,267,425 B1 * | 7/2001 | Dorsey | 43/21.2 |
| 6,370,810 B1 * | 4/2002 | Widerman | 43/21.2 |
| 6,401,381 B1 * | 6/2002 | Broberg | 43/21.2 |
| 6,405,478 B1 * | 6/2002 | Westley | 43/54.1 |
| 6,446,382 B1 * | 9/2002 | Cloutier et al. | 43/54.1 |
| 6,487,814 B1 * | 12/2002 | Arredondo et al. | 43/54.1 |
| 6,658,786 B1 * | 12/2003 | Williams | 43/54.1 |
| 6,729,064 B1 * | 5/2004 | Congialosi | 43/21.2 |
| 6,729,066 B1 * | 5/2004 | Howley | 43/54.1 |
| 6,742,789 B1 * | 6/2004 | Nowak | 43/54.1 |
| 2002/0023381 A1 * | 2/2002 | Chambeyron | 43/54.1 |
| 2005/0051444 A1 * | 3/2005 | Hurt et al. | 206/315.11 |
| 2005/0055869 A1 * | 3/2005 | Corso et al. | 43/54.1 |
| 2005/0155276 A1 * | 7/2005 | O'Keeffe | 43/54.1 |

FOREIGN PATENT DOCUMENTS

| | | | |
|---|---|---|---|
| FR | 2574625 A1 * | 6/1986 | |
| GB | 2400015 A * | 10/2004 | |
| JP | 10-243763 A * | 9/1989 | |
| JP | 1-300836 A * | 12/1989 | |
| JP | 7-241153 A * | 9/1995 | |
| JP | 8-172995 A * | 7/1996 | |
| JP | 8-280310 A * | 10/1996 | |
| JP | 9-47202 A * | 2/1997 | |
| JP | 9-154464 A * | 6/1997 | |
| JP | 9-294520 A * | 11/1997 | |
| JP | 10-108604 A * | 4/1998 | |
| JP | 10-327731 A * | 12/1998 | |
| JP | 11-75652 A * | 3/1999 | |
| JP | 2001-190201 A * | 7/2001 | |
| JP | 2002-112687 A * | 4/2002 | |
| WO | WO-02/13603 A1 * | 2/2002 | |

OTHER PUBLICATIONS

Cabela's Master Catalog Spring, 2005; p. 50, entitled "Angler's Tote".

* cited by examiner

TACKLE BOX ROD CARRIER

FIELD OF THE INVENTION

The invention herein pertains to fishing gear and particularly pertains to a rectangularly shaped tackle box having a series of pairs of fishing rod hangers affixed to the exterior surface.

DESCRIPTION OF THE PRIOR ART AND OBJECTIVES OF THE INVENTION

Fisherman often carry tackle boxes containing lures, weights, hooks and other paraphernalia for fishing in streams, rivers, ponds and the like. It is also usual for a fisherman to manually carry two or more fishing rods along with a tackle box. Manual transportation of these items and other fishing equipment is often inconvenient and burdensome since both hands are occupied during the transportation process. Thus when walking through woods or over uneven terrain a free hand is not available to brush tree limbs aside or to grasp natural objects for balance and stability if needed. Once a fisherman arrives at a desired location along a stream or a pond, there is usually no suitable spot for unloading the fishing rods and other gear in an organized manner, causing such to be scattered about, and making retrieval and use difficult.

Thus with the problems and difficulties associated with conventional methods of carrying rods and tackle the present invention was conceived and one of its objectives is to provide a tackle box rod carrier which is easy to carry with only one hand for extended periods of time.

It is another objective of the present invention to provide a tackle box rod carrier which can be easily opened to obtain lures or other equipment while maintaining the same in an organized fashion.

It is a further objective of the present invention to provide a tackle box rod carrier which provides easy access and storage for multiple fishing rods.

It is also an objective of the present invention to provide a tackle box rod carrier which includes a pair of internal, closeable compartments for storage of additional fishing items.

It is still a further objective of the present invention to provide a tackle box rod carrier which can be economically manufactured and commercialized.

Various other objectives and advantages of the present invention will become apparent to those skilled in the art as a more detailed description is set forth below.

SUMMARY OF THE INVENTION

The aforesaid and other objectives are realized by providing a tackle box rod carrier which is rectangularly shaped and includes a carrying handle. The device includes a case which can be opened to reveal a pair of internal storage compartments. Each compartment includes a divider for separating and organizing small fishing equipment. A planar cover is pivotally affixed inside the case contiguous to each compartment. The covers prevent spilling and mixing of the equipment while the tackle box rod carrier is transported, moved or impacted. Along the exterior of the case are a series of hangers which act as means for releasably holding a plurality of fishing rods. The hangers are of conventional design as found in utility closets for holding broom handles or the like.

In use, the case is opened and placed on a table or other nearby surface. Next, one of the covers is pivoted open to expose the internal storage compartment and divider. Flies, lures, bait, fishing line, tools and other items can be conveniently organized within the divided compartment. Thereafter the cover is closed over the compartment where it is frictionally held in place and now the other cover can be lifted open so the other compartment can likewise be loaded with other fishing gear. Once both compartments are filled and the covers closed, the case is shut by pivoting one side onto the other with the covers then being contiguous along their outer surfaces. Two (2) latches along the top of the case maintain the case in a closed posture. One or more fishing rods can then be placed in the hanger pairs located on the exterior surface of the case.

With the tackle box rod carrier so loaded it can be easily grasped by the handle with one hand and carried for extended distances from a vehicle to a selected fishing spot. Once the fisherman reaches his destination, the tackle box rod carrier can be placed on the ground, the latches opened and the required tackle removed. In a similar manner, one or more fishing rods can be removed from the hangers and prepared for fishing. With the closing of the tackle box rod carrier, all contents remain in a safe, secure condition ready for further use as required.

DETAILED DESCRIPTION OF THE PREFERRED EMBODIMENT AND OPERATION OF THE INVENTION

Figure 1:
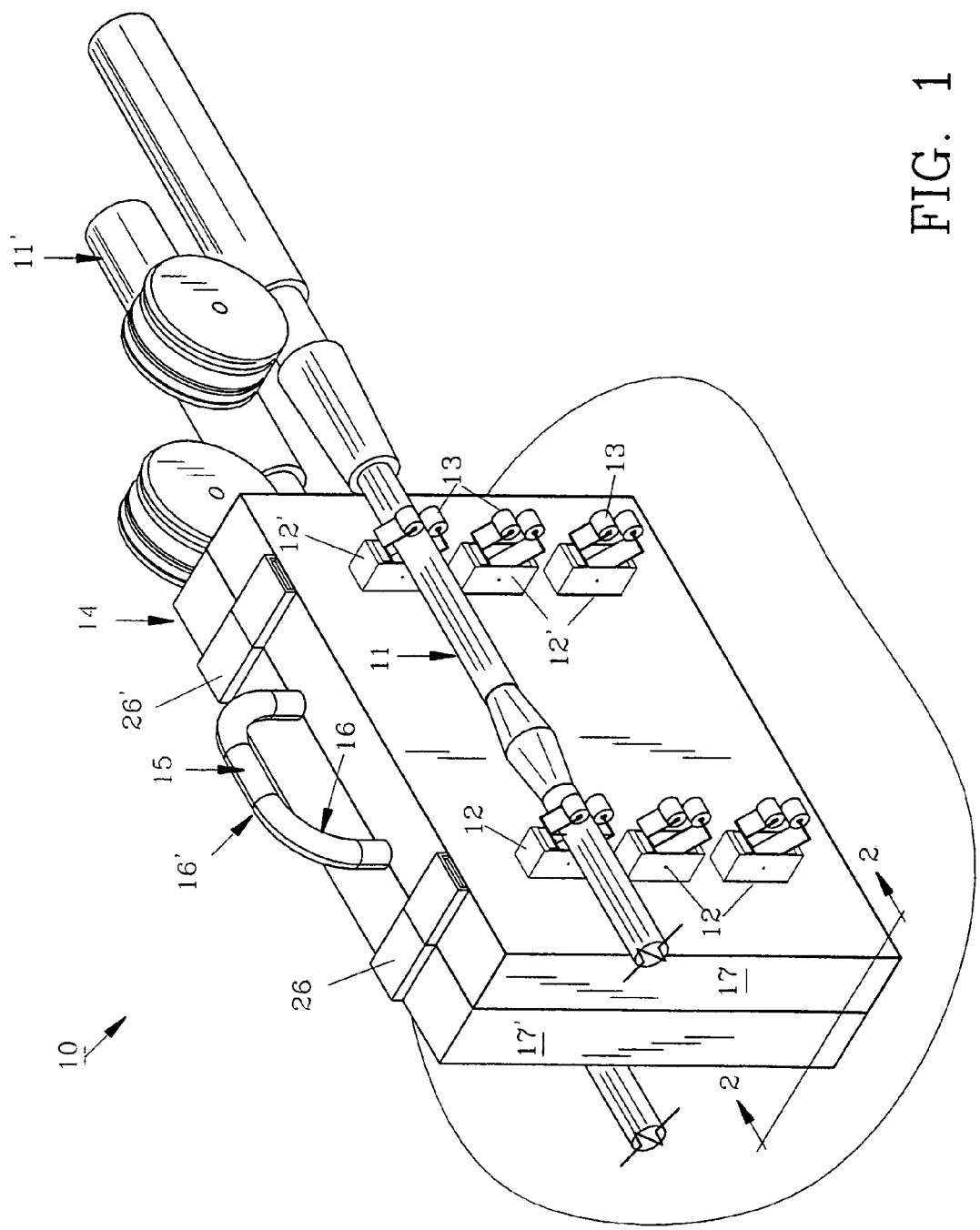
FIG. 1 shows the preferred form of the invention in an upright, closed position.
Figure 2:
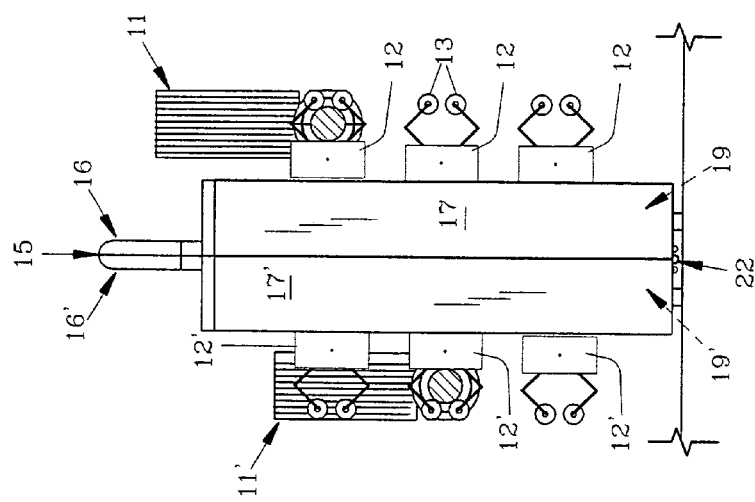
FIG. 2 illustrates an end view of the device as along lines 2—2 of FIG. 1.
Figure 3:
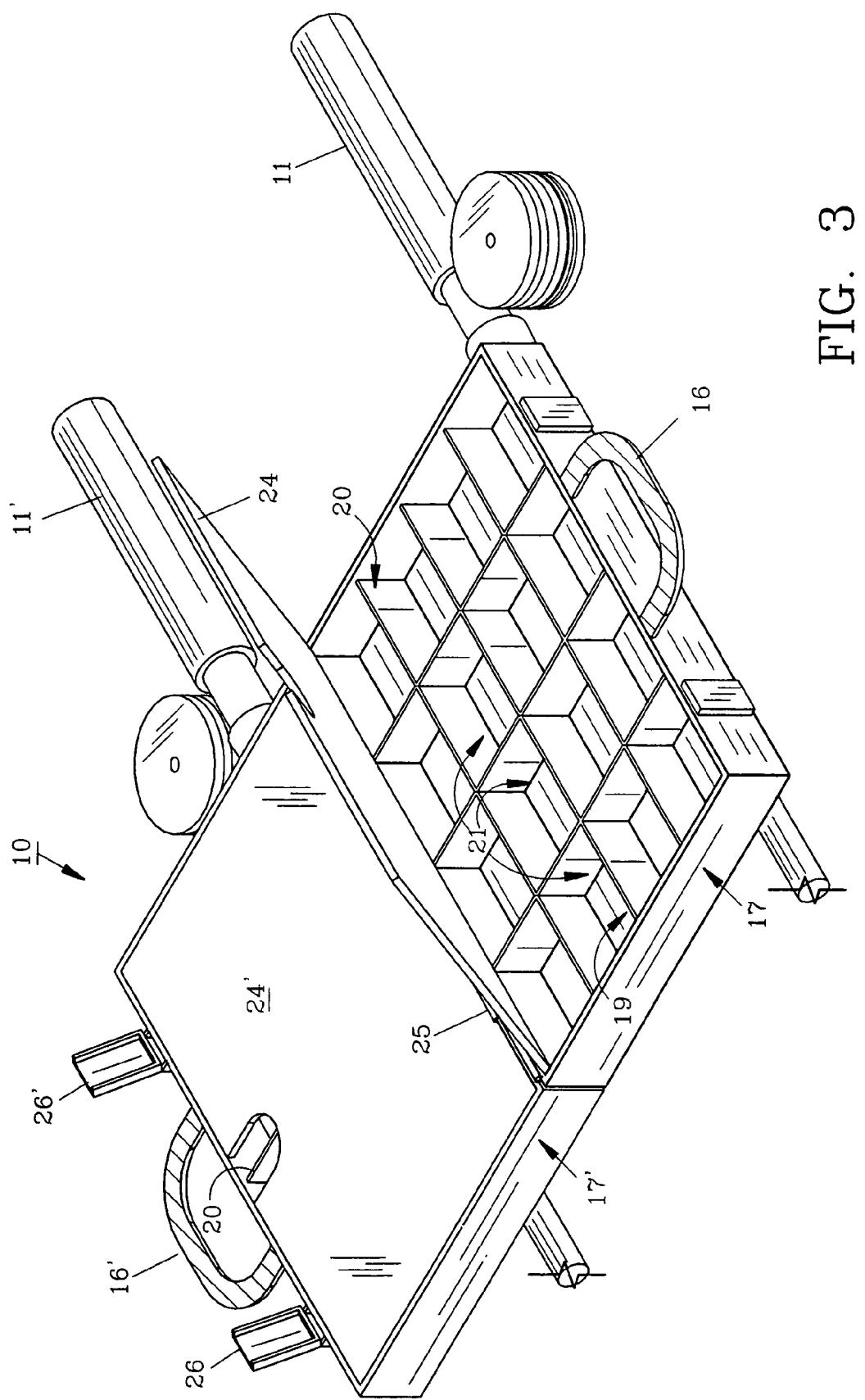
FIG. 3 features the device of FIG. 1 in an open configuration.

For a better understanding of the invention and its operation, turning now to the drawings, FIG. 1 shows preferred tackle box rod carrier 10 in a closed, upright position with fragmented fishing rods 11, 11' releasably adhered by hangers 12, 12' which are aligned in three (3) pairs on each of sides 17, 17' of case 14 (also shown partially in FIG. 2). Hangers 12, 12' are arranged in pairs to provide a means for holding fishing rods 11, 11' (seen fragmented) thereto during transportation. As shown, upper hangers 12, 12' provide a first holding means, middle hangers 12, 12' provide a second holding means and bottom hangers 12, 12' shown in FIG. 1 provide a third holding means along one exterior side of case 14. Each of hangers 12, 12'0 comprise a pair of opposing rollers 13 that receive a fishing rod therebetween. Case 14 includes right side 17 and left side 17' as seen in FIGS. 1, 2 and 3. As would be understood and as shown in FIG. 2, left side 17' of case 14 likewise provides three (3) pairs of hangers 12, 12' which act as holding means for releasably affixing fishing rod 11' thereto. Case 14 is generally rectangularly shaped and includes handle 15 attached along the top surface. Handle 15 is divided into right half 16 and left half 16' as shown in FIGS. 2 and 3.

In FIG. 3 divider 20 which preferably is formed from plastic or other suitable materials separates compartment 19 into sixteen (16) cells 21 for storing and maintaining various fishing tackle items such as hooks, lures, flies, fishing line, tools or the like. As tackle box rod carrier 10 is moved about, cover 24 as shown in FIG. 3 which is pivotally affixed to case 14 by hinge 25 maintains the fishing gear, tools or the like within cells 21. Also cover 24' which is likewise hingedly affixed to case 14, conceals a similar divider 20' (not shown) identical to divider 20 contained within compartment 19' (not shown).

In preparation for a fishing excursion, the method of use includes opening latches 26, 26' as shown in FIG. 1 to part and rotate right side 17 and left side 17' of case 14. Next, cover 24 is then pivoted so fishing tackle and the like can be stored within cells 21 of compartment 19. Likewise, cover 24' is next pivoted to an open position and cells 21' (not shown) thereunder can likewise be filled with small fishing equipment. With covers 24, 24' closed and frictionally engaged along their edges, left side 17' and right side 17 are then pivoted along bottom hinge 22 (FIG. 2) and latches 26, 26' are closed to secure case 14 in a closed posture as shown in FIG. 1. One or more fishing rods 11, 11' are then selected and placed within one of the hanger pairs 12, 12' as seen in FIG. 1. With fishing rods 11, 11' so positioned, handle 15 can be grasped and tackle box rod carrier 10 can be manually transported to a suitable location for use while fishing.

The illustrations and examples provided herein are for explanatory purposes and are not intended to limit the scope of the appended claims.

The invention claimed is:

1. A tackle box rod carrier comprising:
   a rectangularly shaped case defining a left side and a right side, said left and right sides of said case each defining an interior compartment with a plurality of dividers therein which define a plurality of cells for storing and maintaining fishing tackle, each of the left and right sides of said case having a top surface, a bottom surface, and an outer side surface which extends perpendicularly between the top and bottom surfaces;
   a hinge joined to the bottom surfaces of said left and said right sides to allow said sides to pivotally separate in an open position and close in a closed position;
   a plurality of aligned pairs of hangers, said hangers positioned exteriorly on said outer side surfaces of said left and right sides of said case and extending perpendicularly from the outer side surfaces of said left and right sides of said case, said hangers for mounting fishing rods therein, each of said hangers comprises a pair of opposing rollers for engaging said fishing rods;
   a handle, said handle comprising a left side and a right side, said handle mounted on the exterior of said case, said handle left side being U-shaped and extending from the top surface of said left side of said case, said handle right side being U-shaped and extending from the top surface of said right side of said case, said handle left side opposing said handle right side when said case is in the closed position for carrying purposes;
   first and second compartment covers, said first cover pivotally attached inside said case, the first cover positionable over the interior compartment defined by the left side of said case so as to maintain fishing tackle therein by enclosing the compartment, the second cover pivotally attached inside said case, the second cover positionable over the interior compartment defined by the right side of said case so as to maintain fishing tackle therein by enclosing the compartment; and
   wherein the left and right sides of the case and the handle left and right sides meet along a plane which extends parallel to the outer side surfaces in the closed position.

2. The tackle box rod carrier of claim 1, further comprises a pair of latches, said latches mounted on said case, said latches for securing said case in the closed position.

3. The tackle box rod carrier of claim 1 wherein said pairs of hangers are linearly aligned to receive a fishing rod.

4. The tackle box rod carrier of claim 1 wherein said first and said second compartment covers are planar.

5. The tackle box rod carrier of claim 1 wherein said plurality of hangers comprises three pairs of hangers on each of said left and right sides of said case.

\* \* \* \* \*